(12) United States Patent
Metsätähti et al.

(10) Patent No.: US 8,010,579 B2
(45) Date of Patent: Aug. 30, 2011

(54) BOOKMARKING AND ANNOTATING IN A MEDIA DIARY APPLICATION

(75) Inventors: Vesa Metsätähti, Helsinki (FI); Christian Lindholm, Helsinki (FI); Tomi Hakari, Sipoo (FI); Andrea Finke-Anlauff, Braunschweig (DE)

(73) Assignee: Nokia Corporation, Espoo (FI)

( * ) Notice: Subject to any disclaimer, the term of this patent is extended or adjusted under 35 U.S.C. 154(b) by 1341 days.

(21) Appl. No.: 10/715,093

(22) Filed: Nov. 17, 2003

(65) Prior Publication Data
US 2005/0108233 A1    May 19, 2005

(51) Int. Cl.
G06F 17/30 (2006.01)
G06F 3/00 (2006.01)
G06F 3/048 (2006.01)
G09G 5/00 (2006.01)
G09G 5/22 (2006.01)
G06T 11/20 (2006.01)

(52) U.S. Cl. ........ 707/805; 707/821; 707/951; 345/661; 345/440; 345/440.2; 715/762; 715/769; 715/808; 715/963

(58) Field of Classification Search .................. 707/805, 707/821, 913, 951; 345/661, 676, 440, 440.2; 715/762, 763, 769, 808, 809–810, 844, 963, 715/968
See application file for complete search history.

(56) References Cited

U.S. PATENT DOCUMENTS

| | | |
|---|---|---|
| 4,589,140 A | 5/1986 | Bishop et al. |
| 5,241,671 A | 8/1993 | Reed et al. |
| 5,247,611 A | 9/1993 | Norden-Paul et al. |
| 5,323,314 A | 6/1994 | Baber et al. |
| 5,526,480 A | 6/1996 | Gibson |
| 5,557,728 A | 9/1996 | Garrett et al. |
| 5,633,678 A | 5/1997 | Parulski et al. |
| 5,732,184 A | 3/1998 | Chao et al. |
| 5,745,110 A | 4/1998 | Ertemalp |
| 5,781,899 A | 7/1998 | Hirata |
| 5,864,330 A | 1/1999 | Haynes |
| 5,872,566 A | 2/1999 | Bates et al. |
| 5,898,431 A | 4/1999 | Webster et al. |
| 6,023,241 A | 2/2000 | Clapper |
| 6,034,683 A | 3/2000 | Mansour et al. |
| 6,085,205 A | 7/2000 | Peairs et al. |
| 6,167,469 A | 12/2000 | Safai et al. |
| 6,204,846 B1 | 3/2001 | Little et al. |

(Continued)

FOREIGN PATENT DOCUMENTS
CN    1252573 A    5/2000
(Continued)

OTHER PUBLICATIONS

K. Priyantha Hewagamage, Masahito Hirakawa; *Augmented Album: Situation-dependent System for a Personal Digital Video/Image Collection*; 2000; pp. 323-326; 0-7803-6536-4/00; IEEE.

(Continued)

*Primary Examiner* — Srirama Channavajjala
(74) *Attorney, Agent, or Firm* — Alston & Bird LLP

(57) ABSTRACT

A media diary or media management application implemented in a digital device that incorporates a bookmarking and/or annotating mechanism for providing graphical enhancement to media files, calendar events and time periods displayed in the media management application. In addition, the bookmarking and annotation mechanism provides for text notes to be associated with the media files, calendar event or time period and for the text note to be accessible through the bookmark or annotation.

45 Claims, 5 Drawing Sheets

U.S. PATENT DOCUMENTS

| | | | |
|---|---|---|---|
| 6,216,110 B1 * | 4/2001 | Silverberg | 705/7.19 |
| 6,216,131 B1 | 4/2001 | Liu et al. | |
| 6,219,052 B1 | 4/2001 | Gould | |
| 6,256,162 B1 | 7/2001 | Matsumoto et al. | |
| 6,282,362 B1 | 8/2001 | Murphy et al. | |
| 6,301,586 B1 | 10/2001 | Yang et al. | |
| 6,304,881 B1 | 10/2001 | Halim et al. | |
| 6,330,568 B1 | 12/2001 | Boothby et al. | |
| 6,337,694 B1 | 1/2002 | Becker et al. | |
| 6,340,978 B1 | 1/2002 | Mindrum | |
| 6,345,274 B1 | 2/2002 | Zhu et al. | |
| 6,345,288 B1 | 2/2002 | Reed et al. | |
| 6,373,507 B1 | 4/2002 | Camara et al. | |
| 6,380,953 B1 | 4/2002 | Mizuno | |
| 6,380,959 B1 | 4/2002 | Wang et al. | |
| 6,384,845 B1 | 5/2002 | Takaike | |
| 6,404,937 B1 | 6/2002 | Agata et al. | |
| 6,405,218 B1 | 6/2002 | Boothby | |
| 6,408,301 B1 | 6/2002 | Patton et al. | |
| 6,411,724 B1 | 6/2002 | Vaithilingam et al. | |
| 6,433,798 B1 | 8/2002 | Smith et al. | |
| 6,462,752 B1 | 10/2002 | Ma et al. | |
| 6,480,840 B2 | 11/2002 | Zhu et al. | |
| 6,486,896 B1 | 11/2002 | Ubillos | |
| 6,502,100 B1 | 12/2002 | Meyers | |
| 6,532,480 B1 | 3/2003 | Boothby | |
| 6,535,636 B1 | 3/2003 | Savakis et al. | |
| 6,546,399 B1 | 4/2003 | Reed et al. | |
| 6,557,027 B1 | 4/2003 | Cragun | |
| 6,590,585 B1 | 7/2003 | Suzuki et al. | |
| 6,594,693 B1 | 7/2003 | Borwankar | |
| 6,600,510 B1 | 7/2003 | Parulski et al. | |
| 6,621,508 B1 | 9/2003 | Shiraishi et al. | |
| 6,629,100 B2 | 9/2003 | Morris et al. | |
| 6,629,104 B1 | 9/2003 | Parulski et al. | |
| 6,677,965 B1 | 1/2004 | Ullmann et al. | |
| 6,809,724 B1 | 10/2004 | Shiraishi et al. | |
| 6,832,221 B2 | 12/2004 | Takahashi | |
| 6,922,816 B1 | 7/2005 | Amin et al. | |
| 6,996,782 B2 | 2/2006 | Parker et al. | |
| 7,165,227 B2 | 1/2007 | Ubillos | |
| 2001/0045964 A1 | 11/2001 | Camara et al. | |
| 2001/0056434 A1 | 12/2001 | Kaplan et al. | |
| 2002/0054067 A1 | 5/2002 | Ludtke et al. | |
| 2002/0054074 A1 * | 5/2002 | Sugano et al. | 345/730 |
| 2002/0054157 A1 | 5/2002 | Hayashi et al. | |
| 2002/0059256 A1 | 5/2002 | Halim et al. | |
| 2002/0063732 A1 | 5/2002 | Mansikkaniemi et al. | |
| 2002/0075322 A1 | 6/2002 | Rosenzweig et al. | |
| 2002/0075324 A1 | 6/2002 | Combs et al. | |
| 2002/0075330 A1 | 6/2002 | Rosenzweig et al. | |
| 2002/0076217 A1 | 6/2002 | Rodriguez et al. | |
| 2002/0078070 A1 | 6/2002 | Eshelman et al. | |
| 2002/0087546 A1 | 7/2002 | Slater et al. | |
| 2002/0087601 A1 | 7/2002 | Anderson et al. | |
| 2002/0113803 A1 * | 8/2002 | Samra et al. | 345/619 |
| 2002/0122067 A1 | 9/2002 | Geigel et al. | |
| 2002/0122071 A1 | 9/2002 | Camara et al. | |
| 2002/0124004 A1 | 9/2002 | Reed et al. | |
| 2002/0126158 A1 | 9/2002 | Camara et al. | |
| 2002/0140820 A1 | 10/2002 | Borden | |
| 2002/0147744 A1 * | 10/2002 | Smith et al. | 707/507 |
| 2002/0161788 A1 | 10/2002 | McDonald | |
| 2002/0163538 A1 | 11/2002 | Shteyn | |
| 2002/0186252 A1 | 12/2002 | Himmel et al. | |
| 2002/0188602 A1 | 12/2002 | Stubler et al. | |
| 2003/0004856 A1 * | 1/2003 | Brown et al. | 705/37 |
| 2003/0009469 A1 * | 1/2003 | Platt et al. | 707/100 |
| 2003/0009493 A1 | 1/2003 | Parker et al. | |
| 2003/0033296 A1 * | 2/2003 | Rothmuller et al. | 707/3 |
| 2003/0038831 A1 | 2/2003 | Engelfriet | |
| 2003/0051207 A1 | 3/2003 | Kobayashi et al. | |
| 2003/0059112 A1 | 3/2003 | Loui et al. | |
| 2003/0081145 A1 | 5/2003 | Seaman et al. | |
| 2003/0095143 A1 * | 5/2003 | Lauris | 345/762 |
| 2003/0097361 A1 | 5/2003 | Huang et al. | |
| 2003/0107603 A1 | 6/2003 | Clapper | |
| 2003/0110503 A1 | 6/2003 | Perkes | |
| 2003/0115219 A1 | 6/2003 | Chadwick | |
| 2003/0117498 A1 | 6/2003 | Cole et al. | |
| 2003/0123737 A1 | 7/2003 | Mojsilovic et al. | |
| 2003/0126212 A1 | 7/2003 | Morris et al. | |
| 2003/0126603 A1 | 7/2003 | Kim et al. | |
| 2003/0128227 A1 | 7/2003 | Crow et al. | |
| 2003/0128389 A1 | 7/2003 | Matraszek et al. | |
| 2003/0133017 A1 | 7/2003 | Mauro | |
| 2003/0140034 A1 | 7/2003 | Probst et al. | |
| 2003/0146938 A1 | 8/2003 | Geiger | |
| 2003/0154178 A1 | 8/2003 | McIntyre et al. | |
| 2003/0156138 A1 * | 8/2003 | Vronay et al. | 345/772 |
| 2003/0156202 A1 | 8/2003 | van Zee | |
| 2003/0158855 A1 * | 8/2003 | Farnham et al. | 707/102 |
| 2003/0161499 A1 | 8/2003 | Svendsen et al. | |
| 2003/0163474 A1 | 8/2003 | Herz | |
| 2003/0174893 A1 | 9/2003 | Sun et al. | |
| 2003/0182170 A1 | 9/2003 | Meunitz | |
| 2003/0184653 A1 | 10/2003 | Ohkubo | |
| 2003/0187820 A1 | 10/2003 | Kohut et al. | |
| 2003/0193582 A1 | 10/2003 | Kinjo | |
| 2003/0195883 A1 | 10/2003 | Mojsilovic et al. | |
| 2003/0212993 A1 | 11/2003 | Obrador | |
| 2004/0109025 A1 | 6/2004 | Hullot et al. | |
| 2004/0125150 A1 | 7/2004 | Adcock et al. | |
| 2004/0145602 A1 | 7/2004 | Sun et al. | |
| 2004/0177149 A1 | 9/2004 | Zullo et al. | |
| 2004/0201740 A1 * | 10/2004 | Nakamura et al. | 348/231.3 |
| 2005/0044066 A1 | 2/2005 | Hooper et al. | |
| 2005/0084082 A1 * | 4/2005 | Horvitz et al. | 379/114.06 |
| 2005/0091596 A1 | 4/2005 | Anthony et al. | |
| 2005/0105374 A1 | 5/2005 | Finke-Anlauff et al. | |
| 2005/0108234 A1 | 5/2005 | Oksanen et al. | |
| 2005/0108253 A1 | 5/2005 | Metsatahti et al. | |
| 2005/0108643 A1 * | 5/2005 | Schybergson et al. | 715/713 |
| 2005/0108644 A1 | 5/2005 | Finke-Anlauff et al. | |
| 2005/0138066 A1 | 6/2005 | Finke-Anlauff et al. | |
| 2005/0187943 A1 | 8/2005 | Finke-Anlauff et al. | |
| 2006/0248475 A1 | 11/2006 | Abrahamsson | |
| 2007/0300260 A1 | 12/2007 | Holm et al. | |

FOREIGN PATENT DOCUMENTS

| | | | |
|---|---|---|---|
| EP | 0 542 662 A1 | 5/1993 | |
| EP | 1 004 967 A1 | 5/2000 | |
| EP | 1 035 481 A | 9/2000 | |
| EP | 1051034 A1 | 11/2000 | |
| EP | 1 087 303 A | 3/2001 | |
| EP | 1 087 303 A2 | 3/2001 | |
| EP | 1 182 585 A2 | 2/2002 | |
| EP | 1 351 167 A2 | 10/2003 | |
| EP | 1387286 A2 * | 2/2004 | |
| GB | 2 379 116 A | 2/2003 | |
| GB | 2 382 488 A | 5/2006 | |
| JP | 07-21006 | 1/1995 | |
| JP | 07-261661 A | 10/1995 | |
| JP | 08-087234 A | 4/1996 | |
| JP | 08-331654 A | 12/1996 | |
| JP | 09-130861 A | 5/1997 | |
| JP | 10-124246 | 5/1998 | |
| JP | 11-039132 | 2/1999 | |
| JP | 2000-207411 | 7/2000 | |
| JP | 2001-119653 A | 4/2001 | |
| JP | 2001-175691 A | 6/2001 | |
| JP | 2001-202340 | 7/2001 | |
| JP | 2001-203973 | 7/2001 | |
| JP | 2001-312516 A | 11/2001 | |
| JP | 2002-073679 | 3/2002 | |
| JP | 2002-116040 A | 4/2002 | |
| JP | 2003-87624 A | 3/2003 | |
| JP | 2003-209824 | 7/2003 | |
| JP | 2003-216653 A | 7/2003 | |
| JP | 2003-303211 A | 10/2003 | |
| JP | 2003-330586 | 11/2003 | |
| JP | 2004-164552 A | 6/2004 | |
| KR | 10-1998-0081156 A | 11/1998 | |
| KR | 10-1999-0022469 A | 3/1999 | |
| KR | 2001-0038597 A | 5/2001 | |
| KR | 10-2001-0102990 A | 11/2001 | |
| KR | 2004-164552 A | 6/2004 | |

| WO | WO 9937075 A1 | 7/1999 |
| --- | --- | --- |
| WO | WO 00/04726 | 1/2000 |
| WO | WO 01/19049 A2 | 3/2001 |
| WO | WO 01/28227 A1 | 4/2001 |
| WO | WO 02/27545 A2 | 4/2002 |
| WO | WO/02/057959 A2 | 7/2002 |
| WO | WO 02/086735 A1 | 10/2002 |
| WO | WO 03/019402 A1 | 3/2003 |
| WO | WO 03/083715 A1 | 10/2003 |
| WO | WO 2004/061577 * | 7/2004 |

OTHER PUBLICATIONS

Masahito Hirakawa, Priyantha Hewagamage, Tado Ichikawa; *Situation-dependent Browser to Explore the Information Space*.

B. Schneiderman; *Designing the User Interface: Strategies for Effective Human-Computer Interaction*; 1992; pp. 510-549; Chapter 15; XP 002210867.

Girgensohn et al., "Simplifying the Management of Large Photo Collections" *Proceedings of the IFIP TC13 International Conference on Human-Computer Interaction Interact'2003*, Sep. 1, 2003, pp. 196-203.

Ringel et al, "Milestones in Time: The Value of Landmarks in Retrieving Information from Personal Stores", *Proceedings of the IFIP TC13 International Conference on Human-Computer Interaction Interact'2003*, Sep. 1, 2003, pp. 184-191.

Koike et al., "TimeSlider: an interface to specify time point", *Proceedings of the ACM Symposium on User Interface Software and Technology, 10th Annual Symposium. UIST '97*, Oct. 17, 1997, pp. 43-44.

Hurst, W. et al.; User Interfaces for Browsing and Navigation of Continuous Multimedia Data; 2002; pp. 267-270; XP002407105.

Source is Wikipedia page for Podcast, "Podcast", pp. 1-15, dated Apr. 20, 2006, http://en.wikipedia.org/w/index.php?title=Podcast&oldid=49340826, retrieved Feb. 1, 2008.

Rohall, S. L. et al., *Email Visualizations of Aid Communications*; Proceedings of the IEEE Symposium on Information Visualization; Oct. 2001; 4 pages.

Sudarsky, S. et al., *Visualizing Electronic Mail*; Proceedings of the Sixth International Conference on Information Visualisation (IV '02); 2002; 7 pages; The Computer Society; IEEE.

Temple, "The Complete Idiot's Guide to Microsoft Outlook 2000", May 1999, Que, pp. 196-202.

Non-Final Office Action for U.S. Appl. No. 10/792,175 dated Mar. 9, 2007.

Final Office Action for U.S. Appl. No. 10/792,175 dated Sep. 12, 2007.

Advisory Action for U.S. Appl. No. 10/792,175 dated Dec. 27, 2007.

Board of Appeals Examiner's Answer for U.S. Appl. No. 10/792,175 dated Jul. 22, 2008.

Non-Final Office Action for U.S. Appl. No. 10/792,175 dated Jan. 10, 2011.

Non-Final Office Action for U.S. Appl. No. 10/715,161 dated Oct. 5, 2009.

Non-Final Office Action for U.S. Appl. No. 10/715,161 dated Jun. 7, 2010.

Notice of Panel Decision for U.S. Appl. No. 10/715,161 dated Oct. 6, 2010.

Examiner's Answer for U.S. Appl. No. 10/715,161 dated Feb. 4, 2011.

Office Action for EU Appl. No. 04 026 849.2 dated Oct. 19, 2006.

Office Action for EU Appl. No. 04 026 849.2 dated Oct. 19, 2005.

European Search Report for Appl. No. 04 02 6849 completed Jun. 30, 2005.

Summons to Attend Oral Proceedings for European Application No. 04026849.2 dated Aug. 18, 2010.

Decision to Refuse Application for European Application No. 04026849.2 dated Nov. 29, 2010.

Brief Communication—Summary of Facts and Submissions for European Application No. 04026849.2 dated Nov. 29, 2010.

First Office Action for CN Appl. No. 200410103385.0 dated Nov. 3, 2006.

Decision of Rejection in Japanese Application No. 2004-363653 dated Feb. 16, 2009.

Office Action for Korean Appl. No. 10-2004-0093733 dated May 22, 2006.

Office Action for EP Application No. 04 026 171.1 dated Jul. 15, 2008.

European Search Report for EP Application No. 04 02 6171 completed Sep. 8, 2006.

Office Action for JP Application No. 2004-363668 dated Mar. 17, 2008.

Office Action for JP Application No. 2004-363668 dated Sep. 19, 2008.

Decision of Dismissal of Amendment for JP Application No. 2004-363668 dated Jun. 22, 2009.

Office Action for EP Application No. 04 026 451.7 dated Mar. 8, 2006.

Office Action for EP Application No. 04 026 451.7 dated May 22, 2007.

Office Action for EP Application No. 04 026 451.7 dated Oct. 17, 2006.

European Search Report for EP Application No. 04 02 6451 mailed Jul. 8, 2005.

Summons to Attend Oral Proceedings for EP Application No. 04 02 6451.7 dated Aug. 18, 2010.

Brief Communication for EP Application No. 04 02 6451.7 dated Jan. 26, 2011.

Decision of Final Rejection for JP Application No. 2004-363651 dated Jan. 26, 2009.

Notification of Reasons for Refusal for JP Application No. 2004-363651 dated Mar. 31, 2008.

Yiu, K. S. et al., *A Time-Based Interface for Electronic Mail and Task Management*, Design of Computing Systems: Proceedings of HCI International (1997), pp. 1-4.

Non-Final Office Action for U.S. Appl. No. 10/878,695 dated Aug. 18, 2010.

Final Office Action for U.S. Appl. No. 10/878,695 dated Jan. 13, 2011.

Non-Final Office Action for U.S. Appl. No. 10/715,187 dated Mar. 1, 2007.

Final Office Action for U.S. Appl. No. 10/715,187 dated Sep. 12, 2007.

Non-final Office Action for U.S. Appl. No. 10/715,187 dated Apr. 16, 2008.

Final Office Action for U.S. Appl. No. 10/715,187 dated Sep. 19, 2008.

Non-Final Office Action for U.S. Appl. No. 10/715,187 dated Apr. 1, 2009.

Final Office Action for U.S. Appl. No. 10/715,187 dated Dec. 4, 2009.

International Preliminary Report on Patentability for Application No. PCT/IB2005/002034 dated Dec. 28, 2006.

International Search Report and Written Opinion for International Application No. PCT/IB2005/002034 dated Nov. 10, 2005.

Office Action for Chinese Application No. 200580025506.7 dated Oct. 23, 2009.

Office Action for Chinese Application No. 200580025506.7 dated Jun. 28, 2010.

Office Action for Korean Application No. 10-2007-7001856 dated Mar. 5, 2008.

Office Action for Korean Application No. 10-2007-7001856 dated May 3, 2010.

* cited by examiner

BOOKMARKING AND ANNOTATING IN A MEDIA DIARY APPLICATION

FIELD OF THE INVENTION

The present invention relates to digital storage and management of media files and, more specifically, to a media file management application that provides for media files, calendared events and periods of time to be bookmarked and annotated.

BACKGROUND OF THE INVENTION

The rapid growth of digital communication has made it possible for all kinds of digital media items to be communicated amongst various types of wireless and wire line communication devices. For instance, the cellular or mobile telephone is no longer limited to telephonic voice communication and may include other means of digital communication, such as digital networking (i.e., Internet communication, text messaging, and the like). In addition, an increasing number of cellular telephones and other mobile wireless communication devices, such as portable computers, personal data assistants (PDAs) and the like, are being integrated with other means of capturing or producing digital media, such as digital cameras, digital audio recorders, digital video recorders and the like. Technological advances have made it possible for other digital devices, such as digital cameras, digital video recorders, digital audio devices and the like to be equipped with means for digital communication. As more and more digital devices possess the capability to digitally communicate with one another, the amount of digital media items that will be communicated amongst these devices will increase at an alarming rate.

In addition to the onset of more and more digital devices possessing digital communication capabilities, the digital storage capacity of these devices is constantly increasing. In the near future the majority of mobile digital communication terminals may well be equipped with storage capacity in the gigabyte range or greater, allowing these devices to store an enormous amount of digital data. In this environment it will no longer be prohibitive from a memory capacity standpoint to store a voluminous amount of large file types, such as video, audio or other multimedia files.

In the digital communication environment where more and more digital devices, both wireless and wired, are equipped with a means for digital communication and where the storage capacity of these devices has become seemingly endless, the digital communication device will encounter and store innumerable digital media files. As such, the digital communication device will desire a means to access, store, manage and further communicate these digital files in an efficient and user-friendly environment.

For example, if a digital communication device receives a digital media file the user of the device would benefit greatly from an application that automatically places the file into a readily accessible storage area and where managing and accessing of the file in the future can occur efficiently, without the user having to spend a great deal of time searching for the media file.

Most digital communication devices, such as desktop or laptop computers, personal data assistants (PDAs) or the like either come equipped or can be configured by the user to implement a daily planner application. The daily planner allows the user coordinate and manage their upcoming schedule of events by inputting event reminders in a digital calendar. The digital planner provides the unique benefit of sending the user electronic reminders, in the form of alarms or visual or audible messages, when an upcoming event is pending. The digital planner has proven to be a highly successful tool for the businessperson and, in most instances, has replaced the need for conventional hard copy or paper daily planners.

Most digital media files can be easily categorized and stored according to a calendar date. For example, a wedding video can be categorized according to the date of the wedding and photographs taken at a party can be categorized according to the date of the party. These are examples of categorizing the media file based on the creation date of the media file. In other instances the media file can be associated with the date on which the media file is used or presented or the date on which the recipient receives the file. For example, a multimedia presentation for a business meeting may be categorized according to the date of the presentation and a personal text file from a friend may be categorized according to the date received.

Over time, digital devices with large memory capacity possess the capability to acquire and store an enormous volume of media files. This is especially true as we enter a burgeoning digital communication era where more and more digital devices will possess the capability to communicate digitally. For example, in a future where more and multi-function digital devices are prevalent, such as mobile telephones with digital cameras and conventional digital cameras, digital video recorders and the like have the capability to communicate digitally, the devices will be inundated with digital media files. The user of these devices, and all other digital devices capable of media storage, will desire an application that stores and manages the digital media files. A key attribute for such an application is user efficiency; because the user must be able to efficiently locate media files.

As with most file management applications, locating a file can be efficiently performed if the user has the ability to search the file or filter the files of interest. In the case of text files, performing word searches is an ideal way to locate specific files. However, when the file management application is managing media files, such as photographic images or video files, performing a text search is typically limited to searching within the metadata information associated with the media file. In most instances, the metadata information associated with a media file is limited to a file title and creation date, which may not provide enough information to efficiently search for files of interest. In this regard, efficiency in locating media files can be improved if more user-specific information related to the file can be associated to the file and included within the metadata information.

In addition to text searches, media file management applications may utilize a scroll function to allow a representation of the media file to be displayed to the user. Scrolling allows the user to locate files by browsing the files and identifying the file of interest. Especially in instances in which large collections of media files are browsed, users may find it difficult to spot the particular media file in which they are interested.

Therefore, the need exists to develop a media file storage and management application for a digital device that will provide for user efficiency in terms of being able to quickly locate a specific media file. The media file storage and management application should be capable of adding and storing user-specific information related to either media files or period(s) of time to aid in the efficient location of media files. In addition the application should provide for representations of the media files to be annotated so that visual scrolling of the files is enhanced and provides for the files to be filtered in accordance with the annotation.

BRIEF SUMMARY OF THE INVENTION

The present invention provides for a media diary or media management application implemented in a digital device that incorporates a bookmarking and/or annotating mechanism for providing graphical enhancement to media files, calendar events and time periods (collectively referred to herein as items of information) displayed in the media management application. In addition, the bookmarking and annotation mechanism provides for text notes to be associated with the items of information and for the text note to be accessible through the bookmark or annotation. Typically, the term bookmarking, herein, refers to visually identifying items of information with an identifier that is connected with a text note. The text note provides the user of the application with a means for further identifying or distinguishing the items of information. Typically, the term annotating, herein, refers to visually identifying media files, calendar events or time periods with an identifier that heightens the visual awareness of the file, event or time period. The bookmark identifiers and annotation identifiers (collectively referred to herein as information identifiers) are included as metadata associated with the files, events or time periods. Metadata is searchable and scrollable within the media management application to provide the user of the application ease and efficiency in locating files, events and time periods. This, by having the bookmark identifiers and annotation identifiers included in the metadata, the present invention provides for further means of easily and efficiently locating the same within the media management application.

In one embodiment of the invention an application for accessing media files on a digital device is defined. The application comprises a computer readable storage medium having computer-readable program instructions embodied in the medium. The computer-readable program instructions includes first instructions for generating a media view that provides access to digital media files and associates digital media files with a period of time and second instructions for generating an information identifier that is associated with items of information including at least one of a digital media file, a calendared event and a period of time, wherein the information identifier enhances identification of items of information. The information identifier may take the form of an annotation to graphically alter the item of information representation. Alternatively, the information identifier may take the form of a bookmark when the identifier has a text note associated with the identifier.

In an alternate embodiment of the application third instructions may be provided for generating a calendar view that represents time in calendar format and associates events with respective time periods. In those embodiments that entail such third instructions, the second instructions may further include instructions for generating an information identifier that is associated with a calendar event and is displayed in the calendar view. Alternately, the third instructions may be provided for generating a time bar that divides time into segments having a size that depends upon the digital media files in the media view associated with the respective segment of time. In those embodiments that entail such third instructions, the second instructions may further include instructions for generating an information identifier that is associated with a time period and is displayed in the time bar.

Yet another embodiment of the invention is defined by a method for classifying media files in a media diary application. The method includes the step of selecting a information identifier option, selecting a item of information to associate with the selected information identifier option, creating information identifier data for the selected item of information, storing the information identifier data with item of information metadata and optionally, identifying, visually, the item of information as associated with a information identifier.

A further embodiment of the invention is defined by a digital device having a processing unit that executes computer-readable program instructions for accessing media files. The computer-readable program instructions include first instructions for generating a media view that provides access to digital media files and associates digital media files with a period of time, and second instructions for generating an information identifier that is associated with items of information including at least one of a digital media file, a calendared event and a period of time, wherein the information identifier enhances identification of items of information. The information identifier may take the form of an annotation to graphically alter the item of information that is displayed in the media view. Alternatively, the information identifier may take the form of a bookmark when the identifier has a text note associated with the identifier. Additionally, the digital device will include a display in communication with the processing unit that presents the user access to media files through the media view and presents the media file identifier.

Therefore, the present invention provides for a media file storage and management application for a digital device that will provide for user efficiency in terms of being able to quickly locate a specific media file. The invention implements bookmarks and annotations that visually identify and distinguish files, events and time periods within the various views of the media diary display. Thus, the media file storage and management application is capable of adding and storing user-specific information related to either media files or period(s) of time to aid in the efficient location of media files. In addition the application provides for representations of the media files to be annotated so that visual scrolling of the files is enhanced and provides for the files to be filtered in accordance with the annotation.

BRIEF DESCRIPTION OF THE DRAWINGS

Figure 1:
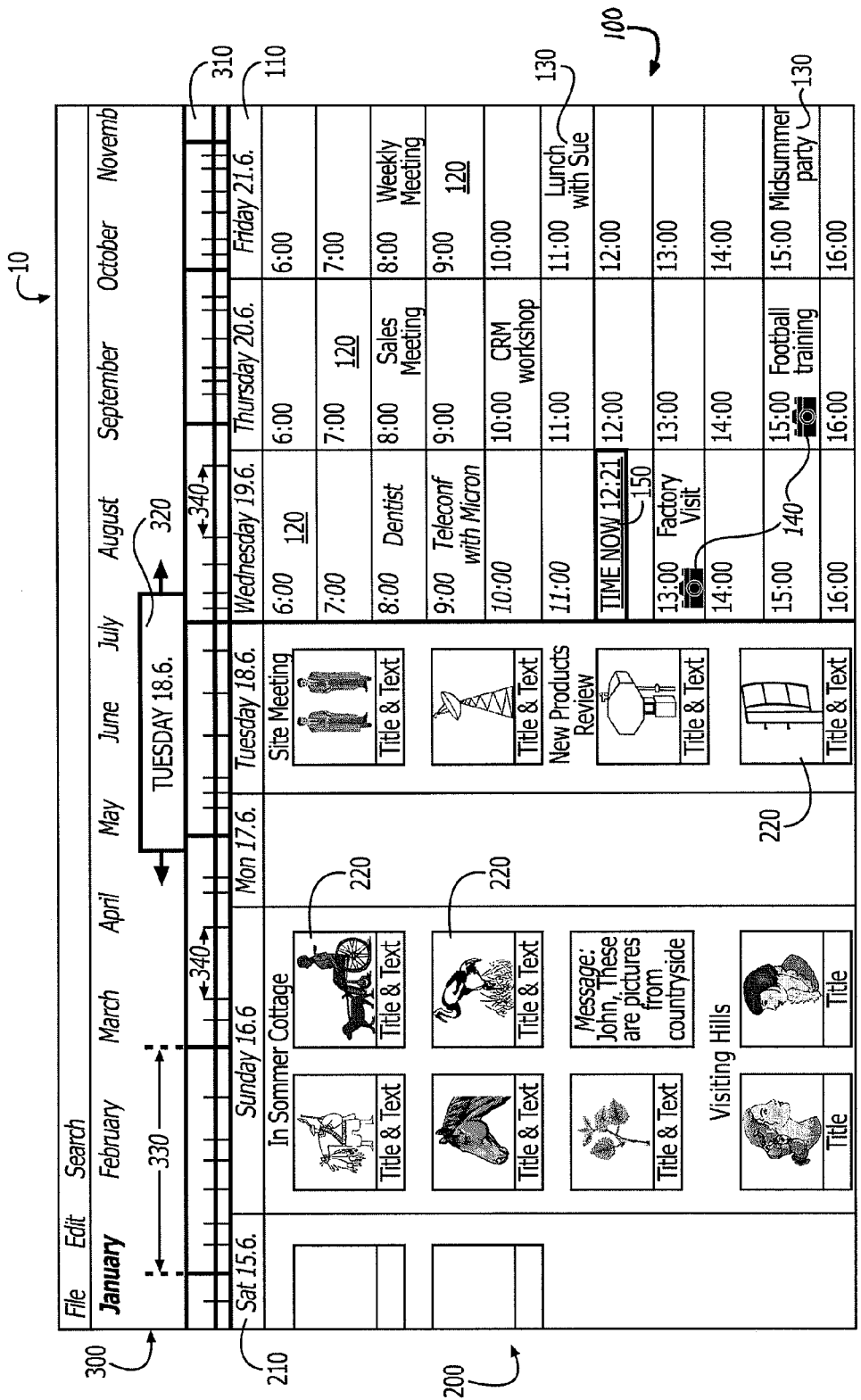
Figure 2:
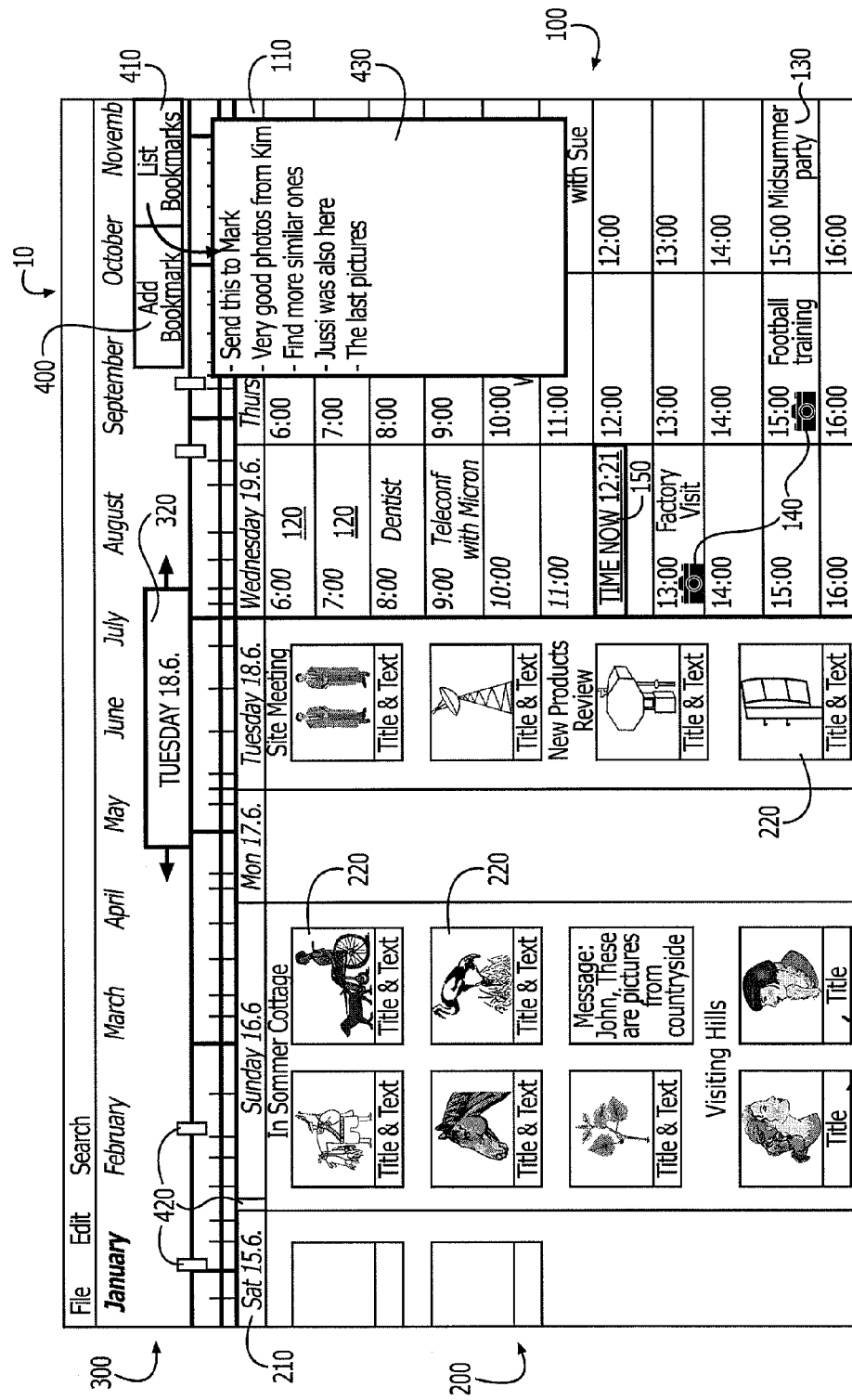

Having thus described the invention in general terms, reference will now be made to the accompanying drawings, which are not necessarily drawn to scale, and wherein:

FIG. 1 is an illustration of a media diary view that combines a calendar view, a media view and a timeline view, in accordance with an embodiment of the present invention FIG. 2 is an illustration of a media diary view that combines a calendar view, a media view and a timeline view and implements bookmark and annotation identifiers, in accordance with an embodiment of the present invention.

Figure 3:
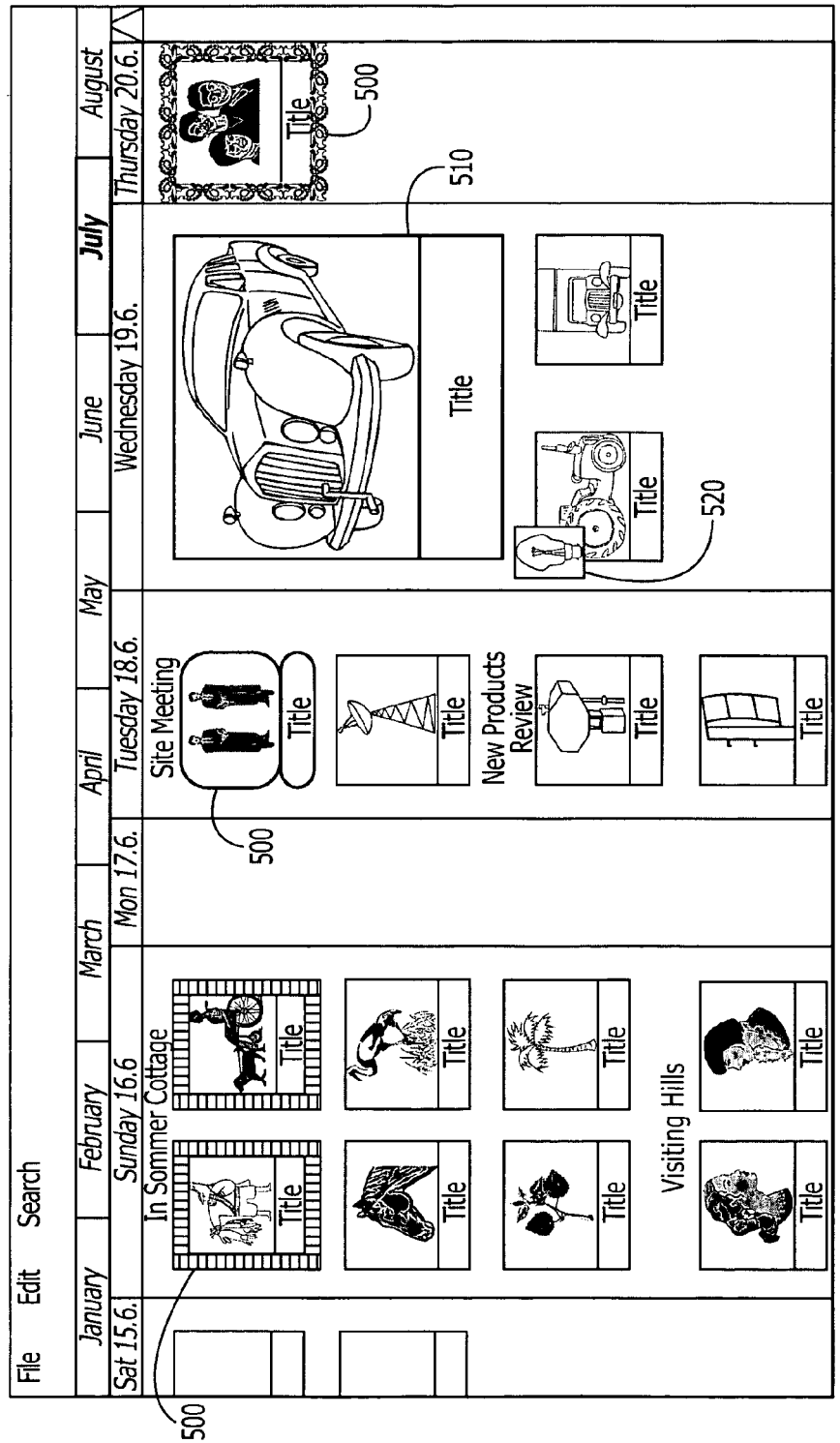

FIG. 3 is an illustration of a media view implementing annotations that graphically alter the media file representation, in accordance with an embodiment of the present invention.

Figure 4:
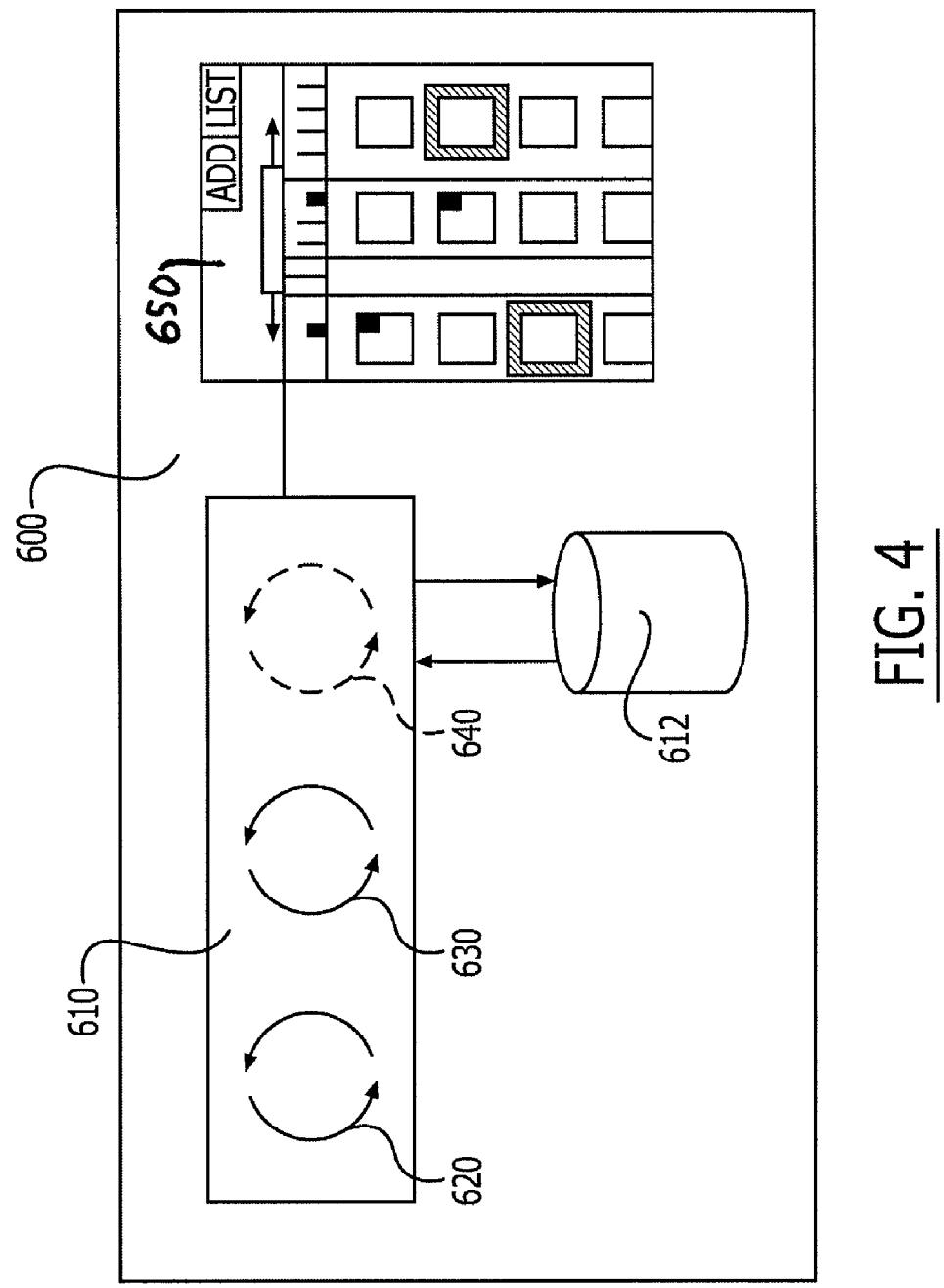

FIG. 4 is a block diagram of a digital device implementing a media diary that incorporates the use of annotation and bookmark identifiers, in accordance with an embodiment of the present invention.

Figure 5:
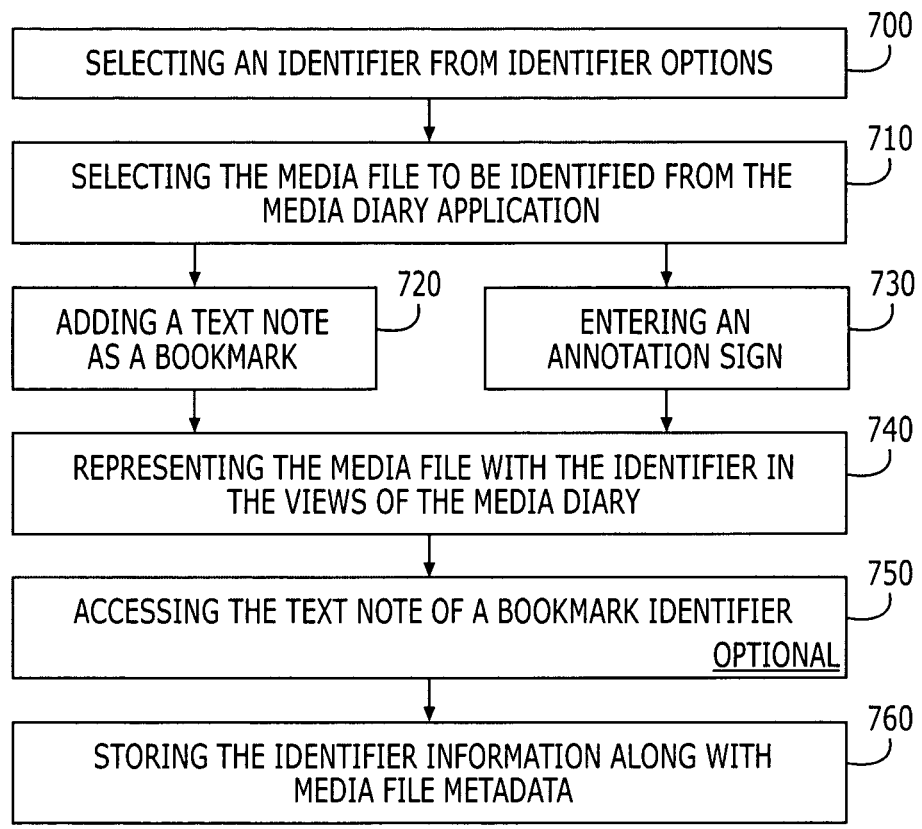

FIG. 5 is a flow diagram of a method for classifying media files in a media diary application, in accordance with an embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides for a media management application (i.e., media diary application) implemented in a digital device and, specifically, to bookmark and annotation functions that assist in the process of efficiently locating within the application items of information, including at least one of a digital media file, a period of time or a calendared event. Collectively the bookmark and annotation functions serve as information identifiers that are associated with items of information and serve to enhance identification of the items of information. Thus, the application herein refers to the term "information identifier", which includes both the bookmark identifier and the annotation identifier.

The bookmark function involves adding note-type information to media files, calendared events or periods of time to further identify the media files, calendared events or periods of time, respectively. The bookmark information will typically be added to the metadata information associated with a media file to further identify the media file. In this regard, the information in the bookmark is text searchable data that will assist the user in locating the media file, event or time period within the diary application. In addition, users of the media diary application will have ready access to a listing of bookmarks, in the form of a pull-down menu, time bar or the like, for the purpose of immediately accessing files, event or periods of time associated with a bookmark. In addition, bookmarking of the media files, the calendared events or the periods of time may define or change an order in which the media files, the calendared events are presented in the media diary. Additionally, a bookmarked media file, calendar event or period of time will typically be visibly identified on the display as being bookmarked. Thus, in a typical media diary, in which the media files may be accessed by scrolling through periods of time associated with the media files, media files or periods of time that are bookmarked will be more visible to the user of the diary and, thus increase the likelihood that these files can be efficiently located via the scroll function.

The annotation function involves adding a visually identifiable feature to the media file or a period of time, so that the annotated media file or period of time is readily identifiable to the user of the diary. For example annotation may involve changing the displayed size of the media file representation, adding frames to the media file representation or otherwise visually highlighting the media file representation or a period of time and/or defining or changing an order in which the media files are presented in the media view to describe priority. In a typical media diary, the media files may be accessed by scrolling through periods of time associated with the media files. Media files or periods of time that are annotated will be more visible to the user of the diary and, thus increase the likelihood that these files can be efficiently located via the scroll function. The annotation information will typically be added to the metadata information associated with a media file to further identify the media file. In this regard, the information in the annotation is text searchable metadata data that will assist the user in locating the media file or time period within the diary application.

In addition, annotated media files and periods of time provide for the media file database to be categorized according to the type of annotation associated with a media file. Categorization of the media files in the diary allows for the media files to be searched and filtered according to the annotation category. Filtering of the media files provides for an additional efficient means of locating media files in the media diary.

Both bookmarks and annotations may be based on any item of information included within the metadata that is associated with the media files, an event or a period of time. The application may be configured or the media diary user may request that a bookmark or annotation be created for a media file, event or period of time having a specific item of metadata. For example, a media diary user may specify that bookmarking or annotation of all media files having "Summer Holiday 2003" included in the metadata.

In order to gain a further understanding of the concept of bookmarks and annotations, the detailed description provides for an example of a media diary application implementing bookmarks and annotations, in accordance with an embodiment of the present invention. The media diary application herein disclosed is by way of example only. Other media diaries that implement bookmarks and annotations are also contemplated and are within the inventive concepts herein disclosed.

The exemplary media diary application herein disclosed will associate media files with a moment of time, period of time or event, so that the user can manage media files according to a moment of time, period of time or event. For the sake of brevity and so as to not confuse the reader, the term of "period of time" is used herein to refer to both a time range, as well as, a particular moment in time. Typically, the period of time will be a specific date associated with a date that the media file was created or intended for. For example, if the media file is an image or video file of a birthday party, the media application may categorize and store the file according to the date of the birthday party and/or the individual having the birthday. For a complete description of the media diary application see co-pending U.S. patent application Ser. No. 10/715,187, entitled, "Media Diary Application for use with a Digital Device", filed on Nov. 17, 2003, in the name of inventor Myka et al., and assigned to the same assignee as the present invention. That application is herein incorporated by reference as if set forth fully herein.

The exemplary media diary application described herein, as well as all other media diary applications that implement the bookmark or annotation function of the present invention, may be implemented and executed on any electronic device that incorporates a display, such as a desktop or portable computer, cellular telephone, personal data assistant (PDA), digital camera, digital camcorder, e-book device, television, digital audio player or the like. In addition the media diary application may be implemented on electronic devices that are connected to an external display, such as a set-top box (STB), personal video recorder (PVR), digital video recorder (DVR) or the like. While in most implementations the digital device that executes the media diary application will be capable of any type of wireless or wireline network communication, such as wireless telecom, short range radio network, Bluetooth®, Wireless Local Area Network (WLAN), Radio Frequency Identification (RFID), Internet Protocol Data Casting (IPDC), Digital Video Broadcasting (DVB), Infrared Data Association (IrDa), Internet or the like, it is not required that the digital device be adapted to communicate via a network. Devices that are capable of requiring digital media files internally or may access media files through memory devices (e.g., flash storage device, memory sticks, video and audio storage tapes, CD, DVD, removable hard disc device (HDD) and the like) are also applicable.

In accordance with an embodiment of the present invention, the media diary application will be embodied by a computer-readable storage medium having computer-readable program instructions stored in the medium. The storage medium will typically be a memory device, such as flash ROM memory, HDD or the like. The programming instructions may be written in a standard computer programming language, such as C++, Java or the like. Upon execution by a processing unit as described below, the program instructions will implement the various functions of the media diary application as described below. The computer-readable program instructions include first instructions that will generate a media view that provides access to digital media files and associates digital media files with time information, such as a moment or period of time. The computer-readable program instructions also includes second instructions that will generate a bookmark identifier that allows users of the media diary application to visually identify digital media files of interest or time periods of interest and, optionally, associate text notes with digital media files of interest or time periods of interest. Additionally, the computer-readable program instructions may include third instructions that will generate a calendar view that represents time in calendar format and associates events with respective time information, such as a moment or periods of time. In embodiments that entail a calendar view, the bookmark identifier will allow users of the media diary application to visually identify events in the calendar view and, optionally, associate text notes with the events. While the first, second and optional third instructions may be modules, objects or the like that communicate with one another, the first, second and optional third instructions need not be discrete or separable portions of the program instructions and may be interspersed throughout if so desired.

FIGS. 1-3 provide examples of displayed views, commonly referred to as screen shots, that a user of the media diary will access and interface with when using the media diary. In order to gain an understanding of the functionality of the bookmarks and annotations of the present invention it is necessary to briefly explain the concept and functionality of the media diary application in relation to FIG. 1. FIG. 1 illustrates an example of a media diary view 10, which combines a calendar view 100, a media view 200 and a timeline view 300. As depicted, the calendar view 100 is displayed on the right-hand side of the digital device's display, the media view 200 is displayed on the left-hand side of the display and the timeline view features are displayed above both the calendar view and the media view.

The calendar view 100 portion of the overall media diary view 10 provides for the entry of calendar events or reminders and provides the user with a daily planner application, in accordance with an embodiment of the present invention. It is noted that the calendar view herein depicted and described is by way of example only; other calendar views that provide for the display of calendar events or reminders are also contemplated and within the inventive concepts herein disclosed. Alternatively, the calendar view may be generated by another calendar or personal planner application, in which case, the calendar view is imported into the media diary application from the auxiliary calendar application.

The calendar view includes date columns 110, which correspond to a specific date. In the example shown, three date columns are visible on the display corresponding to the current date (i.e., Wednesday, 19 June) and the subsequent two dates. Typically, upon activation of the calendar view the current date will be displayed in the left-hand column of the calendar view with columns for the subsequent dates positioned sequentially to the right. As will be apparent, the calendar view may be differently oriented, such as with rows as opposed to columns or the current date may be displayed in the right hand column, if so desired. In an alternate embodiment the calendar view may include columns 110, which may correspond to any moment of time, such as year, month, day, hour or the like. Additionally upon activation of the calendar view the current moment of time may be displayed on the middle of the view.

The date columns 110 include multiple time blocks 120, which provide a descriptive area for information related to calendar events 130. In the embodiment shown, the time blocks correspond to one-hour time blocks, although the blocks may be for other lengths of time, such as 30-minute blocks. Further, for example if a column represents a year, the time block 120 may represent a month. The calendar view will be vertically scrollable, so that, all of the time blocks for a date column will be viewable by the user. In addition, the calendar view will typically be horizontally scrollable to provide for a view of other date or time columns 110. In addition, the time blocks may include reminder icons 140, which provide the media diary user a visual reminder related to an upcoming calendar event. For example in the depicted embodiment, the camera icon reminds the user that calendared event requires or will benefit from a having a camera on-hand.

The information related to calendar events 130 will typically be inputted by the user and include information, such as title of the event, topic of the event, date and time of the event, location of the event, individuals attending the event and the like. A calendar event may be inputted by activating, via keystroke or mouse-type input signal, the time block associated with the event. Upon activation, a window or view is made visible that allows for the user to input information related to the event. Once the calendar event has been inputted and text displayed in the time block, the details of the calendar events may be accessible by activating, via keystroke or mouse-type input signal, the calendar event. In addition to manually inputting calendar events, the media diary may import calendar events from other sources or applications that are being executed on the digital device, such as from other, internal or external, personal planner or calendar applications, email systems or the like. Further, the information related to a calendar event 130 creates metadata information related to the calendar event or reminder.

The time blocks 120 may include a time now identifier 150 that may be accentuated in bold-faced type or other way graphically accentuated in the time block that includes the current time. The time now identifier serves to indicate the current moment of time. The time now identifier will be an active identifier that displays the current time, in hour and minutes, and moves forward to the next time block with the passage of time. In addition, the calendar view 100 may graphically distinguish between time blocks and calendar events that are in the past and time blocks and calendar events that are in the future. In the illustrated example, time blocks and events in the past are designated by italicized text and time blocks and events in the future are designated by non-italicized, standard text. As the time now identifier moves to the next time block to indicate the passage of time, the distinguishing graphics of the time blocks and calendar events will also change to indicate the proper time state.

The media view 200 portion of the media diary view 10 provides for digital media files, such as digital images, digital video, digital audio, computer games, computer software, digital text files, emails, short message service (SMS) messages, multimedia message service (MMS) messages or the like, to be accessible to the media diary user, in accordance with an embodiment of the present invention. Typically the media files that are represented in the media view will be associated to a past calendar event or past reminder. It is noted that the media view herein depicted and described is by way of example only; other media views that provide for the display of media file representations in association with a moment of time or a time period are also contemplated and within the inventive concepts herein disclosed. Alternatively, the media files that are represented in the media view may be associated with a moment or period of time based on a timestamp in the media file, without having noted an event related to the media file, in advance, in the calendar view or application.

The media view of the illustrated embodiment includes date columns 210, which correspond to a specific date, although the media view may be differently oriented if so desired. In the example shown, four date columns are visible on the display corresponding to the four previous dates. In an alternate embodiment the media view may include columns 210, which may correspond to any moment of time, such as a year, a month, a week, a day, an hour or the like. The date columns will include media file representations 220 that are related to media files and are connected, in time, to the specific date, event and/or time. For example, the media file representations may include representations that provide the user with access to digital files, such as video files, image files, audio files, computer games, computer software, text files, emails, short message service (SMS) messages, multimedia message service (MMS) messages and the like and provide the user with information pertaining to the content of the files. The media file representations may include an icon, or a thumbnail image, a portion of the text of a text document or message or any other suitable media file representation with or without a title of the media file.

Typically, the media diary will receive the media file from a digital recording function associated with the device or via digital communication from other devices. For example:

1) If the digital device is a cellular telephone that incorporates a digital camera or any other digital device that serves as a digital recording device, a digital media file (i.e., image) may be communicated directly via cellular telephone access from the camera/telephone device to the media diary in another device.
2) If the digital device is an independent digital camera or any other digital recording/storing/playing device and equipped with a wireless or wireline network connection the digital media file may be communicated directly from networked device to a media diary in another device.
3) If the digital device is an independent digital camera or any other digital recording/storing/playing device and equipped with short range digital communication means the digital media file may communicated first to a long range digital communication device (i.e. cellular telephone, a PDA, laptop computer or the like) that then passes the files to another device with a media diary. Alternatively, in proximity, a file transfer may occur directly to another device with a media diary.
4) The media files may be communicated by a physical memory unit/device transferred from one device to another device.

As such, the digital recording/storing/playing device from which the media file is communicated (i.e., the passing device) may include, and implement, the media diary application or may not include the media diary application. If the passing device includes the media diary application, the media files may be processed for media diary purposes prior to communication to other devices.

The communication/synchronization of the media files may be automatic after a creation of a new media file, or after a certain amount of media files have been created. Alternatively, the communication may occur at a selected time or on a request of a user and may include a single media file or a group of media files. The communication/synchronization may occur via any wireless or wireline network communication method, such as for example via SMS, MMS or file transfer. The communication, i.e. synchronization, may also occur from a back end media diary application/device to any digital recording/storing/playing device with or without the media diary application.

The media file will typically have associated metadata, in the form of a timestamp, event name, file name, location information, people in the event or in the media file, objects in the media file, file type, file size or the like. The media file metadata may be automatically inputted by the digital recording device at the time of the creation of the media file or may be manually inputted, such as at the time of creation of the media file or receipt or transfer of the media file. In addition, it is possible for the metadata to previously exist in conjunction with a calendar event in the media diary and to be associated with the digital media file at the moment the file is created, if the device creating the media file executes the media diary application.

Once the media diary receives the media file, the media file metadata is combined and/or correlated with the calendar event metadata information, i.e., the date and time, the name of the event or the like. The combined and/or correlated metadata information is associated and stored with the media file in the media diary, such that, when a user accesses the media file via the media file representation in the media view the user will be presented with the combined metadata and calendar event information. See for example, media file representations 220 of FIG. 2, in which, a thumbnail image is combined with a title and text entry. Additionally, media files forming or related to a specific joint group, e.g. based on a specific event or a time period, will be placed in the media view in a joint group 230 under a common title or subject. The title or subject may be manually inputted or may be inherited from metadata related to a calendar event or reminder, or, exclusively, from metadata related to the media file. The last option becomes relevant if the media file does not have a correspondence event or reminder in the associated calendar application.

The timeline view 300 portion of the media diary view 10 provides for a time bar 310 and a time handle 320. The timeline view will be generated by the computer-readable program instructions as implemented in association with a digital device. It is noted that the timeline view herein depicted and described is by way of example only; other timeline views that provide for the display of a timeline in combination with a media view and a calendar view are also contemplated and within the inventive concepts herein disclosed.

The time handle 320 allows the media diary to be scrolled forward in time and backward in time. As depicted, the calendar view 100 displays the current date, indicated by a current time identifier 150, and the two subsequent dates, for example. The media view 200 displays the four previous dates, for example. The time handle is associated with the center most column, that is, in the depicted example, the column associated with the previous day, i.e. Tuesday 18, June. If the time handle is moved from the stationary position to the left, the calendar view, media view and, in some instances the time bar will scroll to the right, such that, more past dates in the media view will be scrolled and displayed.

Moving the time handle to the left, such that more past dates in the media view are scrolled and displayed will eventually cause the calendar view to be scrolled out of the timeline view. If the time handle is moved from the stationary position to the right, the calendar view, the media view and, in some instances the time bar will scroll to the left, such that, more future dates in the calendar view will be displayed. Moving the time handle to the right, such that more future dates in the calendar view are scrolled and displayed will eventually cause the media view to be scrolled out of the timeline view. The stationary position may be any predefined position relative to the display, but is usually in the centerline of the media diary display, or in the centerline of the time bar, or, alternatively, in the centerline of the media view. Alternatively, both media view and calendar view may have their own media handles (not shown in the figure), and they may be scrolled independently.

The time bar 310 allows the device user to focus in on specific dates. In the example shown, the bold cased blocks 330 may indicate weeks and the individual vertical lines 340 within the blocks may indicate ranges for specific dates on which media files currently exist. A space between the ranges indicates the amount of media files associated or stored on a specific date. Different days may be graphically altered, e.g. by different shading and/or color, to distinguish them from each other. For example, every second day may have dark shading and every third day may have light shading. Different weeks may also be graphically altered, e.g. by different shading and/or color, to distinguish them from each other.

FIG. 2 provides an illustration of a media diary view 10 that incorporates an information identifier function, in accordance with an embodiment of the present invention. As depicted, the media diary view includes a calendar view 100, a media view 200 and a timeline view 300. The timeline view includes add bookmark/annotation key 400 and list bookmark/annotation key 410. The location of the add bookmark/annotation key and list bookmark/annotation key is shown by way of example, these keys may be located in any other location on the media diary view 10. In addition, the time bar 310 and date column 210 have bookmark identifiers 420 that indicate that a bookmark exists for either a period of time or a media file associated with the period of time.

The add bookmark/annotation key 410 will typically be activated to initiate an information identifier function, such as a bookmark or annotation function. Activation of the add bookmark/annotation key may cause a window or dropdown menu to appear that lists available bookmark options or annotation options (not shown in FIG. 2). A user may choose the bookmark option and associate the bookmark option with a media file, a period of time or an upcoming calendared event. Associating the bookmark option may entail a mouse-type "drag and drop" process wherein the chosen bookmark option is moved to the item of information, such as a media file, a calendared event or a period of time that will be bookmarked. Once the bookmark option has been associated with an item of information, such as a media file, a calendared event or a period of time, a bookmark window (not shown in FIG. 2) may be displayed to allow the user to input the bookmark note.

The information in the bookmark note will be stored as metadata type information related to the item of information (i.e., media file, calendar event or period of time). As such, the information in the bookmark note is searchable data. In instances in which the media diary application implements a search engine (not shown in FIG. 2), it will be possible to search for a bookmark note by searching for the information/text in the bookmark note or for searching for bookmarked files, events or time periods. For example, a user may perform a text search for the term, "Jussi" and all media files, calendar events or time periods having a bookmark containing the term "Jussi" will be displayed to the user in the form of search results. Additionally, a user may perform a search for all bookmarked media files, all bookmarked calendar events or all bookmarked time periods. In instances in which the media diary application provides for a time handle 320, scroll searching may be implemented to locate files, events or time periods that have been bookmarked.

Once the bookmark has been entered, an information identifier, such as bookmark identifier 420 will typically be displayed in the time bar 310, the date column 110 or 210, a time block 120 associated with a calendar event or a media file representation 220 to indicate that a bookmark exists for the media file, the calendar event or the period of time. The bookmark identifiers may be activated, typically by keystroke or mouse-type function, to display either the associated media file, calendar event period of time associated with the bookmark or the bookmark note itself.

The list bookmark/annotation key 420 may be activated to display a bookmark list window 430 or dropdown menu that lists all of the bookmarks in the media diary. The list window may provide for all of the bookmarks in the diary or it may be selectively limited to the bookmarks only associated with media files, calendared events and/or periods of time or it may be further limited to the bookmarks associated with media files, calendar events and/or periods of time within the visible view of the media diary, media view or calendar view. The bookmarks displayed in the list window may typically be activated to display the media file, calendar event or period of time associated with the bookmark. Once the media file, calendar event or period of time is displayed, the user can access the bookmark by activating the bookmark identifier or access the media file or calendar event by activating the media file representation 220 or calendar event 130.

Annotations may be added to media files, calendar events or periods of time in much the same fashion as bookmarks are added to media files, calendared events or periods of time. The annotation option may be selected from a dropdown menu associated with the edit function, or a dedicated key may be defined for the annotation option, alternatively, the add bookmark/annotation key 410 may include an annotation option to allow the user to add annotations to items of information, such as media files, calendar events or time periods. A user may choose the annotation option and associate the annotation option with the item of information (i.e., a media file, a period of time or an upcoming calendared event). Associating the annotation option may entail a mouse-type "drag and drop" process wherein the chosen annotation option is moved to the media file, calendared event or period of time that will be bookmarked. Once the annotation option has been associated with an item of information, such as a media file, a calendared event or a period of time, an annotation window will be displayed to allow the user to choose the format of the annotation. Once the annotation has been entered, the media file, calendar event or time period will be displayed in annotated form in the media diary.

Annotation formats may include various different means of altering the media file representation, calendar event or period of time. For example, the size of the media file representation, calendar event or time period may be altered, typically increased to accentuate the media file, calendar event or time period on the display. Additionally, annotation may take the form of adding a unique frame around the periphery of the media file representation, time block or time period or any other technique for graphically altering or emphasizing the media file representation, calendar event or time period. Annotation may also take the form of highlighting the annotated item, adding text to the annotated item or providing any other annotation identifier. Additionally, annotation may define or change an order in which the media files are presented in the date column in the media view to define priority. For example, annotated media files may be displayed at or near the top of the date column closest to the time bar.

FIG. 3 provides an illustration of a media view 200 of a media diary application that depicts various forms of annotating media file representations. For example, an annotated media file may be represented by frames 500, enlarged media file representation 510 or annotation identifier 520. It is noted that the frames 500 of the FIG. 3 are depicted in three different formats. The different formats of the frames provide for categorization of the frame annotations and each frame category is searchable and scrollable within the media diary application. As noted previously, the media diary application may be configured or the media diary user may request that certain metadata in the media file, time period or event, trigger the creation of a bookmark or an annotation. In this instance, the annotation may take the form of a specified color frame, a group frame for all media files that include the metadata of interest. Although FIG. 3 is limited to annotations of media files, it also possible, and within the inventive concepts herein disclosed, to annotate calendared events and time periods.

The chosen format of the annotation and/or text of the annotation will be stored as metadata type information related to the media file, calendar event or period of time. As such, the format of the annotation is searchable data. In instances in which the media diary application implements a search engine, it will be possible to search for an annotated file, event or time period by searching for the format of the annotation. For example, a search may be performed for all files, events or time periods that have a specific frame type, and all files, events and time periods that are annotated with that specific frame type will be displayed to the user as search results or the browse function will focus on the files, events or time periods that are annotated with the specific frame type. In instances in which the media diary application provides for a time handle 320, scroll searching may be implemented to locate files, events or time periods that have been bookmarked or annotated.

A further embodiment of the invention is defined by a digital device that implements the media diary application and the specific functions of information identifiers, such as annotation and bookmark identifiers, in accordance with an embodiment of the present invention. FIG. 4 illustrates a block diagram of digital device 600 that implements the media diary. As previously noted, the digital device will typically be a digital device capable of digital communication with other digital devices, such as a mobile terminal including for example, a mobile telephone, a PDA, laptop computer or the like. However, the digital device may be any other device capable of displaying the media diary of the present invention such as a digital camera, digital video recorder, digital audio recorder or the like.

The digital device 600 will include a processing unit 610, such as a processor, an application specific integrated circuit, analog and/or digital circuitry, or any other similar device that executes computer-readable program instructions for accessing media files. Wherein the program instructions and the media files are generally stored in memory device 612. The computer-readable program instructions will include first instructions 620 for generating a media view that provides access to digital media files and associates digital media files with a period of time and second instructions 630 for generating an information identifier that is associated with items of information including at least one of a digital media file, a calendared event and a period of time, wherein the information identifier enhances identification of items of information. The device may, optionally, include third instructions 640 that generate a calendar view that represents time in calendar format and associates events with respective periods of time. In embodiments that include third instructions, the second instructions may generate an information identifier in the firm of a calendar event identifier, such as a bookmark and/or an annotation that is associated with a calendar event. In addition, the digital device will include, or may be in external communication with, a display 650 that is in communication with the processing unit and provides a presentation mechanism for the calendar view and the media view or the combined media view, calendar view and timeline view.

The present invention is also embodied in methods for classifying media files, periods of time and/or calendar events in a media diary application in accordance with embodiments of the present invention. FIG. 5 presents a flow diagram of a method for classifying items of information, such as media files, events or periods of time in a media diary application. At step 700, the user selects an information identifier from identifier options within the media diary application. The options may include bookmarking a media file, time period or calendar event with a text note, sign or annotating a media file, time period or calendar event by graphically altering or enhancing the same. Once an option is selected, at step 710, the user selects the media file, calendar event or time period that is to be identified with either a bookmark or annotation. Alternatively, the steps 700 and 710 could be in an opposite order. If the file, event or time period is to be bookmarked with a text note, at step 720, the user enters a text note that is associated with the file, event or time period. If the file, event or time period is to be annotated, at step 730, the user enters the desired annotation or bookmark sign, such increasing the size of the file, framing the file or event or any other means of altering or enhancing the file, event or time period as displayed in one of the associated views. Once the identifier is created in the form of a bookmark or an annotation, at step 740, the file, the event or the time period is visually represented in conjunction with the identifier that acknowledges the file, event or time period as being bookmarked or annotated. At optional step 750, if the file, event or time period has been bookmarked or annotated, a user may access the text note of the bookmark or annotation by activating the identifier that is displayed in conjunction with the file, event or time period that has been bookmarked. Typically, activation will be in the form of a mouse-type movement or a keystroke.

At optional step 760, the identifier information, including either the text note of a bookmark or an annotation form is added to the stored metadata information related to the file, event or time period. The metadata information serves as the searchable database for the file, event or time period and is used for keyword searches and scroll-type visual searches.

The described embodiments of the present invention provide for a media diary or media management application implemented in a digital device that incorporates a file, event or time period identifying function. Media files, calendar events and/or time periods are visually identified using bookmarks or annotations. The bookmarks provide for the files, events or time periods to be associated with a text note and annotations provide for the files, events or time periods to be graphically enhanced or altered for visual display by the media diary. By storing the identifiers as metadata, the bookmarks and annotations serve as searchable data that assists the user of the media diary in efficiently locating the media file, calendar event or time period of interest.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An application for accessing media files on a digital device, the application comprising a computer readable storage medium having computer-readable program instructions embodied in the medium, the computer-readable program instructions comprising:
  first instructions for generating a media view that provides access to digital media files and associates digital media files with a period of time;
  second instructions for generating an information identifier that is associated with at least one item of information including at least one of a digital media file, a calendared event and a period of time, wherein the information identifier enhances identification of the at least one item of information by displaying a frame around the at least one item of information based on metadata associated with the item of information; and
  third instructions for generating a time bar that divides time into segments having a size that depends upon the digital media files in the media view associated with a respective segment of time.

2. The application of claim 1, wherein the second instructions for generating an information identifier further includes instructions for including the information identifier in metadata associated with the respective item of information.

3. The application of claim 1, further including fourth instructions for generating a calendar view that represents time in calendar format and associates events with respective time periods.

4. The application of claim 3, wherein second instructions for generating an information identifier that is associated with at least one item of information including at least one of a digital media file, a calendared event and a period of time further includes an information identifier associated with a calendar event that is displayed in the calendar view.

5. The application of claim 1, wherein the second instructions for generating an information identifier that is associated with at least one item of information including at least one of a digital media file, a calendared event and a period of time further includes an information identifier associated with a period of time that is displayed in the time bar.

6. The application of claim 1, wherein second instructions for generating an information identifier that is associated with at least one item of information including at least one of a digital media file, a calendared event and a period of time further includes an information identifier associated with a digital media file that is displayed in the media view.

7. The application of claim 1, wherein the second instructions for generating an information identifier include instructions for altering a size, color, or border of the information identifier associated with the at least one item of information.

8. The application of claim 1, wherein the second instructions for generating an information identifier further includes instructions for providing for a text note to be associated with a respective item of information and to be included in metadata associated with the respective item of information, the frame around the at least one item of information being associated with the text note.

9. The application of claim 8 wherein the instructions for providing for a text note to be associated with the respective item of information further includes instructions for displaying a window, after the information identifier is associated with the respective item of information, in order to allow a user to input the text note to be associated with the respective item of information.

10. The application of claim 8, wherein the second instructions for generating an information identifier includes instructions for respectively displaying different types of frames around multiple items of information, the different types of frames being associated with different text notes.

11. The application of claim 10, wherein the second instructions for generating an information identifier includes instructions for selecting one or more frames of the different types of frames from a list of frame types.

12. The application of claim 11, wherein the second instructions for generating an information identifier includes instructions for displaying the list of frame types when an information identifier option key is associated with a selected item of information.

13. The application of claim 12, wherein the second instructions for generating an information identifier includes instructions for displaying a pop-up window for entering a text note to be associated with the selected item of information when the information identifier option key is associated with the selected item of information.

14. The application of claim 13, wherein the second instructions for generating an information identifier includes instructions for adding the text note entered into the pop-up window to a selectable list of text notes.

15. The application of claim 14, wherein the second instructions for generating an information identifier includes instructions for searching the items of information by frame type and/or text note.

16. The application of claim 1, wherein the second instructions for generating an information identifier includes instructions for displaying the framed items of information near the top of the media view.

17. An apparatus comprising:
  a processing unit that executes computer-readable program instructions for accessing media files, the computer-readable program instructions comprising:
    first instructions for generating a media view that provides access to digital media files and associates digital media files with a period of time, and
    second instructions for generating an information identifier that is associated with at least one item of information including at least one of a digital media file, a calendared event and a period of time, wherein the information identifier enhances identification of the at least one item of information;
  wherein the second instructions for generating an information identifier further includes:
    instructions for providing for a text note to be associated with a respective item of information and to be included in metadata associated with the respective item of information; and
    instructions for graphically altering a representation of the respective item of information in a manner visually distinct from the associated text note, the graphically altering including visually annotating items of information by adding frames around a representation of the item of information based on metadata associated with the item of information, wherein the processing unit also executes computer-readable program instructions for accessing media files, the computer-readable program instructions further comprising third instructions for generating a time bar that divides time into segments having a size that depends upon the digital media files in the media view associated with a respective segment of time.

18. The apparatus of claim 17, wherein the second instructions for generating an information identifier further includes instructions for including the information identifier in metadata associated with the respective item of information.

19. The apparatus of claim 17, wherein the processing unit executes computer-readable program instructions for accessing media files, the computer-readable program instructions further comprising fourth instructions for generating a calendar view that represents time in calendar format and associates events with respective time periods.

20. The apparatus of claim 19, wherein the second instructions for generating an information identifier that is associated with at least one item of information including at least one of a digital media file, a calendared event and a period of time further includes an information identifier associated with a calendar event that is displayed in the calendar view.

21. The apparatus of claim 17, wherein the second instructions for generating an information identifier that is associated with at least one item of information including at least one of a digital media file, a calendared event and a period of time further includes an information identifier associated with a period of time that is displayed in the time bar.

22. The apparatus of claim 17, wherein second instructions for generating an information identifier that is associated with at least one item of information including at least one of a digital media file, a calendared event and a period of time further includes an information identifier associated with a digital media file that is displayed in the media view.

23. The apparatus of claim 17, wherein the instructions for graphically altering a representation of the respective item of information in a manner visually distinct from the associated text note include instructions for altering a size, color, or border of the representation of the item of information.

24. The apparatus of claim 17 wherein the instructions for providing for a text note to be associated with a respective item of information further includes instructions for displaying a window, after the information identifier is associated with the respective item of information, in order to allow a user to input the text note to be associated with the item of information.

25. The apparatus of claim 17, wherein the second instructions for generating an information identifier further includes instructions for providing for a text note to be associated with a respective item of information and to be included in metadata associated with the respective item of information, the frame around the at least one item of information being associated with the text note.

26. The apparatus of claim 25, wherein the second instructions for generating an information identifier includes instructions for respectively displaying different types of frames around multiple items of information, the different types of frames being associated with different text notes.

27. The apparatus of claim 26, wherein the second instructions for generating an information identifier includes instructions for selecting one or more frames of the different types of frames from a list of frame types.

28. The apparatus of claim 27, wherein the second instructions for generating an information identifier includes instructions for displaying the list of frame types when an information identifier option key is associated with a selected item of information.

29. The apparatus of claim 28, wherein the second instructions for generating an information identifier includes instructions for displaying a pop-up window for entering a text note to be associated with the selected item of information when the information identifier option key is associated with the selected item of information.

30. The apparatus of claim 29, wherein the second instructions for generating an information identifier includes instructions for adding the text note entered into the pop-up window to a selectable list of text notes.

31. The apparatus of claim 30, wherein the second instructions for generating an information identifier includes instructions for searching the items of information by frame type and/or text note.

32. The apparatus of claim 17, wherein the second instructions for generating an information identifier includes instructions for displaying the framed items of information near the top of the media view.

33. The apparatus of claim 17, further comprising a display in communication with the processing unit that presents a combined view of the media view and the media file identifier.

34. A method comprising:

generating a media view that provides access to digital media files and associates digital media files with a period of time;

generating an information identifier that is associated with at least one item of information including at least one of a digital media file, a calendared event and a period of time, wherein the information identifier enhances identification of the at least one item of information by displaying a frame around the at least one item of information based on metadata associated with the item of information; and generating a time bar that divides time into segments having a size that depends upon the digital media files in the media view associated with a respective segment of time.

35. The method of claim 34, wherein generating an information identifier further comprises including the information identifier in metadata associated with the respective item of information.

36. The method of claim 34, further including generating a calendar view that represents time in calendar format and associates events with respective time periods.

37. The method of claim 36, wherein generating an information identifier that is associated with at least one item of information including at least one of a digital media file, a calendared event and a period of time further includes an information identifier associated with a calendar event that is displayed in the calendar view.

38. The method of claim 34, wherein generating an information identifier that is associated with at least one item of information including at least one of a digital media file, a calendared event and a period of time further includes an information identifier associated with a period of time that is displayed in the time bar.

39. The method of claim 34, wherein generating an information identifier that is associated with at least one item of information including at least one of a digital media file, a calendared event and a period of time further includes an information identifier associated with a digital media file that is displayed in the media view.

40. An apparatus comprising:
a processing unit that executes computer-readable program instructions for accessing media files, the computer-readable program instructions comprising:
first instructions for generating a media view that provides access to digital media files and associates digital media files with a period of time;
second instructions for generating an information identifier that is associated with at least one item of information including at least one of a digital media file, a calendared event and a period of time, wherein the information identifier enhances identification of the at least one item of information by displaying a frame around the at least one item of information based on metadata associated with the item of information; and
third instructions for generating a time bar that divides time into segments having a size that depends upon the digital media files in the media view associated with a respective segment of time.

41. The apparatus of claim 40, wherein the second instructions for generating an information identifier further includes instructions for including the information identifier in metadata associated with the respective item of information.

42. The apparatus of claim 40, wherein the computer-readable program instructions further include fourth instructions for generating a calendar view that represents time in calendar format and associates events with respective time periods.

43. The apparatus of claim 42, wherein the second instructions for generating an information identifier that is associated with at least one item of information including at least one of a digital media file, a calendared event and a period of time further includes an information identifier associated with a calendar event that is displayed in the calendar view.

44. The apparatus of claim 40, wherein the second instructions for generating an information identifier that is associated with at least one item of information including at least one of a digital media file, a calendared event and a period of time further includes an information identifier associated with a period of time that is displayed in the time bar.

45. The apparatus of claim 40, wherein the second instructions for generating an information identifier that is associated with at least one item of information including at least one of a digital media file, a calendared event and a period of time further includes an information identifier associated with a digital media file that is displayed in the media view.

\* \* \* \* \*